United States Patent [19]

Pfaendner et al.

[11] Patent Number: 5,212,278

[45] Date of Patent: May 18, 1993

[54] POLYARYLENE ETHERS

[75] Inventors: Rudolf Pfaendner, Rimbach/Odenwald; Thomas Kainmüller, Lindenfels/Odenwald; Kurt Hoffmann, Lautertal, all of Fed. Rep. of Germany; Andreas Kramer, Düdingen; Friedrich Stockinger, Courtepin, both of Switzerland

[73] Assignee: Ciba-Geigy Corporation, Ardsley, N.Y.

[21] Appl. No.: 493,058

[22] Filed: Mar. 13, 1990

[30] Foreign Application Priority Data

Mar. 17, 1989 [CH] Switzerland .................. 995/89

[51] Int. Cl.$^5$ ............... C08G 75/23; C08G 8/02; C08G 14/00; C08G 65/38
[52] U.S. Cl. ........................ 528/171; 528/125; 528/126; 528/128; 528/174; 528/175; 528/219; 528/220; 528/226; 528/391; 525/390; 525/534
[58] Field of Search ............... 528/171, 128, 125, 174, 528/126, 175, 219, 220, 391, 226; 525/390, 534

[56] References Cited

U.S. PATENT DOCUMENTS

| | | | |
|---|---|---|---|
| 3,875,103 | 4/1975 | Leslie | 528/391 |
| 4,008,203 | 2/1977 | Jones | 528/391 |
| 4,008,205 | 2/1977 | Jones | 528/391 |
| 4,777,235 | 10/1988 | Kelsey et al. | 528/174 |
| 4,808,694 | 2/1989 | Edmonds, Jr. et al. | 528/125 |
| 4,829,143 | 5/1989 | Clendinning et al. | 528/125 |
| 4,904,754 | 2/1990 | Heinz | 528/125 |
| 4,925,910 | 5/1990 | Heinz | 528/173 |
| 4,952,665 | 8/1990 | Ebata et al. | 528/125 |
| 5,013,816 | 5/1991 | Bobbink et al. | 528/125 |
| 5,081,214 | 1/1992 | Schneller | 528/391 |

FOREIGN PATENT DOCUMENTS 3616602  11/1987  Fed. Rep. of Germany.

OTHER PUBLICATIONS

Patent Abstracts of Japan, 12, 132 (C-490) (2979) Apr. 22, 1988.
C.A. 108, 151201r (1988).
C.A. 108, 151202s (1988).
C.A. 108, 151203t (1988).

*Primary Examiner*—John Kight, III
*Assistant Examiner*—P. Hampton-Hightower
*Attorney, Agent, or Firm*—Luther A. R. Hall; William A. Teoli, Jr.

[57] ABSTRACT

The invention relates to polyarylene ethers which contain, based on the total amount of structural elements present in the polyether resin, 5-100 mol % of a recurring structural element of the formula I

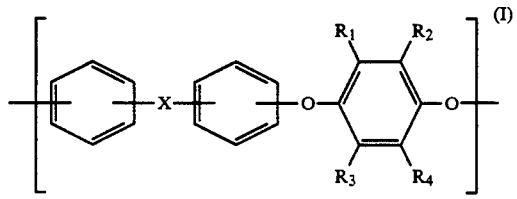

and 0-95 mol % of a recurring structural element of the formula II

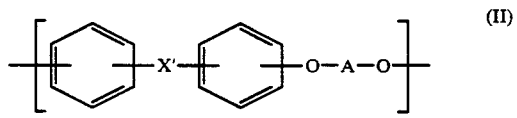

in which X and X′ independently of one another are —SO—, —SO$_2$— or —CO—, one of the radicals R$_1$, R$_2$, R$_3$ and R$_4$ is phenyl or phenyl which is substituted by one to three (C$_1$–C$_4$)alkyl groups and the remaining radicals R$_1$, R$_2$, R$_3$ and R$_4$ independently of one another are hydrogen, (C$_1$–C$_4$)alkyl, phenyl or phenyl which is substituted by one to three (C$_1$–C$_4$)alkyl groups, and A is an aromatic radical, at least 25% of the bonds X and-/or Y and/or the bridge members contained in A being —SO$_2$—.

These industrial materials are distinguished by very good mechanical properties and good solubility.

17 Claims, No Drawings

POLYARYLENE ETHERS

The present invention relates to novel polyarylene ethers, a process for their preparation and their use as industrial materials.

Polyether-ketones and -sulfones containing phenyl-substituted arylene bridge members are known from Japanese Preliminary Published Specifications 253,618/87; 253,619/87 and 253,627/87. These are described as insoluble in the customary solvents. Nevertheless, for many uses there is the need for polymers of this type to be processed, for example to films, or introduced into other systems, such as matrix resins, from a solution. U.S. Pat. No. 3,875,103 mentions that polyether-sulfones form unstable solutions in chlorinated hydrocarbons. To avoid this disadvantage, a specific solvent mixture (cyclohexanone/dimethylsulfoxide) is employed.

The aim of the present invention was to provide polyarylene ethers which are suitable as industrial materials having very good mechanical properties and which have an improved solubility compared with known polyarylene ether ketones and sulfones. Surprisingly, this can be achieved by incorporating structural elements derived from hydroquinones containing aromatic substituents into the polyarylene ether ketone or sulfone chain.

The high quality thermoplastic resins according to the invention are polyarylene ethers which contain, based on the total amount of structural elements present in the polyether resin, 5-100 mol % of a recurring structural element of the formula I

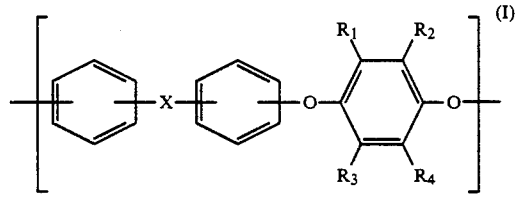

and 0-95 mol % of a recurring structural element of the formula II

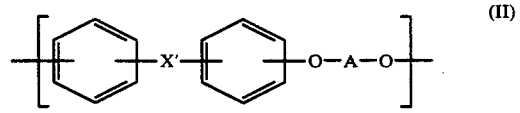

in which X and X' independently of one another are —SO—, —SO$_2$— or —CO—, one of the radicals R$_1$, R$_2$, R$_3$ and R$_4$ is phenyl or phenyl which is substituted by one to three (C$_1$-C$_4$)alkyl groups and the remaining radicals R$_1$, R$_2$, R$_3$ and R$_4$ independently of one another are hydrogen, (C$_1$-C$_4$)alkyl, phenyl or phenyl which is substituted by one to three (C$_1$-C$_4$)alkyl groups, and A is a group of the formulae IIIa to IIIg

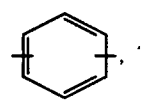

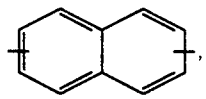

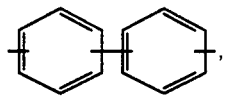

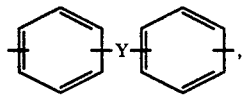

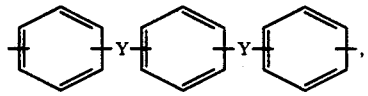

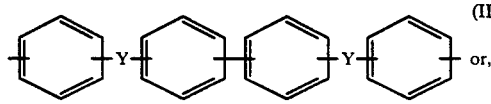

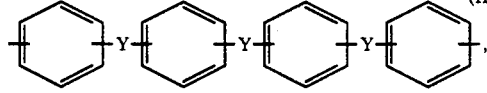

in which Y is —CH$_2$—, —C(CH$_3$)$_2$—, —C(CH$_3$)(C$_6$H$_5$)—, —C(CF$_3$)$_2$—, —S—, —SO—, —SO$_2$—, —O— or —CO—, with the proviso that at least 25% of the bonds X and/or X' and/or Y are —SO$_2$—.

The aromatic groups can be unsubstituted or substituted by one to four (C$_1$-C$_4$)alkyl groups, preferably one or two (C$_1$-C$_4$)alkyl groups, for example methyl.

If several bridge members Y occur per molecule, these do not necessarily have to have the same meaning.

It is essential to the invention that at least one of the substituents R$_1$, R$_2$, R$_3$ or R$_4$ in formula I is a phenyl group. In particularly preferred compounds, this is unsubstituted, but it can also be substituted by one, two or three (C$_1$-C$_4$)alkyl groups, such as methyl, ethyl, n-propyl, isopropyl, n-butyl, sec-butyl or tert-butyl, preferably methyl.

The other substituents R$_1$, R$_2$, R$_3$ and R$_4$ can have the same meaning-described above-if the steric conditions allow, or can be hydrogen or (C$_1$-C$_4$)alkyl, such as methyl, ethyl, n-propyl, isopropyl or n-butyl. Methyl and in particular hydrogen are preferred.

Especially preferred compounds contain structural elements of the formula I in which one or two of the radicals R$_1$, R$_2$, R$_3$ and R$_4$ is phenyl or tolyl, in particular phenyl, and the others are, in particular, hydrogen.

The preferred meaning of X in formula I and X' in formula II is —SO$_2$— or —CO—, and in particular —SO$_2$—.

The preferred meaning of Y in the formulae IIId, IIIe, IIIf and IIIg is —C(CH$_3$)$_2$—, —S—, —SO$_2$—, —O— or —CO—, —SO$_2$— is particularly preferred.

The group A preferably corresponds to a formula IIIa, IIIb, IIIc or IIId in which Y is —C(CH$_3$)$_2$—, —S—, —SO$_2$—, —O— or —CO—. Groups of the formulae IIIb, IIIc or IIId are particularly preferred.

The polyarylene ethers according to the invention preferably contain 10-100 mol % of a recurring structural element of the formula I and 90-0 mol % of a recurring structural element of the formula II.

Particularly preferred polyarylene ethers contain 25-100 mol % of a recurring structural element of the formula I and 75-0 mol % of a recurring structural element of the formula II.

It has been found that for good thermal properties (high glass transition temperature), the content of $-SO_2-$ groups (X and/or X' and/or Y) should be at least 25%, preferably more than 50% and especially preferably more than 75%.

The polyarylene ethers according to the invention have an average weight-average molecular weight of 2000 to 200,000, preferably 5000-100,000, which can be determined, for example, by light scattering.

The polyarylene ethers according to the invention can be prepared, for example, by subjecting a compound of the formula IV

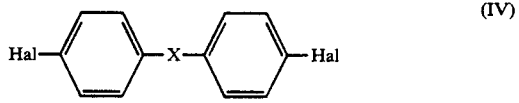
(IV)

in which Hal is halogen, in particular fluorine or chlorine, and X is as defined above, to a polycondensation reaction with a hydroquinone of the formula (V)

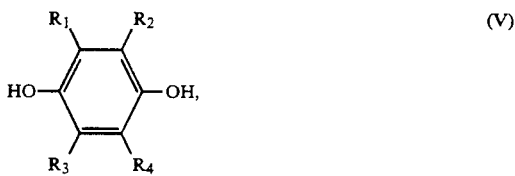
(V)

in which $R_1$, $R_2$, $R_3$ and $R_4$ are as defined above, by itself or with a mixture of a compound of the formula V and a phenol contained therein to the extent of 95 mol %, of the formula VI

HO—A—OH (VI)

in which A is as defined above, in a manner which is known per se in the presence of alkaline catalysts in a polar aprotic solvent.

Instead of the diphenols of the formulae V and VI, it is also possible for the corresponding alkali metal phenolates or alkaline earth metal phenolates, for example the potassium or calcium phenolates, to be employed in a manner which is known per se.

The polycondensation reaction is usually carried out in approximately equimolar ratios of the compounds IV:V or IV:(V+VI). In this connection, approximately equimolar amounts are understood as a molar ratio of 0.8:1.2 to 1.2:0.8, preferably 0.8:1.0 to 1.0:0.8.

Alkaline catalysts which are used in the process are as a rule alkali metal and alkaline earth metal carbonates, such as sodium carbonate, potassium carbonate or calcium carbonate; nevertheless, other alkaline reagents, such as sodium hydroxide, potassium hydroxide or calcium hydroxide, can also be used.

Polar aprotic solvents which can be employed in the process for the preparation of the polyether resins according to the invention are, for example, dimethyl sulfoxide, dimethylacetamide, diethylacetamide, tetramethylurea, N-methylcaprolactam, N-methylpyrrolidone and, preferably, diphenyl sulfone.

The reaction is advantageously carried out at elevated temperature, preferably up to the reflux temperature of the solvent, that is to say up to about 350° C.

It is often advisable also to use an entraining agent, for example chlorobenzene, xylene or toluene, in order to be able to remove the water formed during the reaction azeotropically from the reaction mixture.

The compounds of the formula IV are known and in some cases are commercially available. Examples of suitable compounds of the formula IV are 4,4'-difluorobenzophenone; 1,3-bis-(4-fluorobenzoyl)-benzene, 4,4'-dichlorobenzophenone and preferably 4,4'-difluorodiphenyl sulfone and 4,4'-dichlorodiphenyl-sulfone.

The compounds of the formula V are likewise known. Phenylhydroquinone is commercially available. The other compounds of the formula V can be obtained, for example, by reduction of the corresponding benzoquinones. The substituted benzoquinones can be prepared, for example, by reaction of benzoquinone with aromatic diazonium compounds, for example in accordance with D. E. Kvalnes, J. Am. Chem. Soc. 56, 2478 (1934).

The following compounds of the formula V, for example, are particularly suitable: phenylhydroquinone and 2,5-diphenylhydroquinone; 2,6-diphenylhydroquinone; tolylhydroquinone; and 2-methyl-5-phenylhydroquinone, 2-ethyl-5-phenylhydroquinone or 2-methyl-5(2,4,6-trimethylphenyl)-hydroquinone.

The compounds of the formula VI are likewise commercially available. Examples of suitable compounds are hydroquinone and bisphenol A; 1,5-dihydroxynaphthalene, 2,6-dihydroxynaphthalene, 2,7-dihydroxynaphthalene, 4,4'-dihydroxybenzophenone and 4,4'-dihydroxydiphenyl ether; 4,4'-dihydroxydiphenyl sulfide and preferably 4,4'-dihydroxybiphenyl and 4,4'-dihydroxydiphenyl sulfone.

Examples of alkyl-substituted compounds of the formula VI are 4,4'-dihydroxyl-3,3',5,5'-tetramethylbiphenyl and 4,4'-dihydroxy-3,3',5,5'-tetramethyldiphenyl sulfone.

The polyether resins according to the invention can be employed and processed, for example to shaped articles or films, in the manner customary for thermoplastics, or employed as matrix resins, adhesives or coating agents. Before processing of the polyarylene ethers, which are in the form of, for example, a pressing powder, melt or solution, the customary additives, for example fillers, pigments, stabilizers or reinforcing agents, such as carbon fibres, boron fibres or glass fibres, can be added. The polyarylene ethers according to the invention can also be processed together with other thermoplastics.

The polyarylene ethers according to the invention are preferably suitable as matrix resins for the preparation of composite fibre systems, it being possible for the customary fibres used for reinforcing industrial materials to be employed as reinforcing fibres. These can be organic or inorganic fibres, naturally occurring fibres or synthetic fibres, such as Aramid fibres, and can be in the form of fibre bundles, orientated or non-orientated fibres or continuous fibres. Glass fibres, asbestos fibres, boron fibres, carbon fibres and metal fibres, for example, are used as reinforcing fibres.

Another preferred possible use for the polyarylene ether ketones and in particular for the sulfones comprises modification of other plastics. These plastics can on principle be thermoplastics or thermosets. Modification of thermosetting resins, in particular epoxy resins or bismaleimides, has acquired particular importance. Such polymer systems adapted to particular requirements are described, for example, in U.S. Pat. No. 3,530,087. Such systems have acquired particular importance as matrix resins which are employed for the production of composite components. About 5–100, preferably 10–80 parts by weight of polyarylene ether are usually employed per 100 parts by weight of plastic to be modified.

The unexpectedly high solubility of the polyarylene ether sulfones according to the invention in methylene chloride and the very good stability of these solutions are to be particularly emphasized.

EXAMPLE 1

A mixture of 18.62 g (0.1001 mol) of phenylhydroquinone, 66.35 g of diphenyl-sulfone, 15.40 g (0.114 mol) of potassium carbonate and 56 g of xylene is heated at a bath temperature of 200° C. under nitrogen in a round-bottomed flask with a stirrer and inert gas connection, and a xylene/water mixture is distilled off. Towards the end of the distillation process, vacuum (2 mbar) is applied for a short time. 25.65 g (0.1001 mol) of 4,4'-difluorodiphenyl-sulfone are then added to the reaction mixture and the temperature is increased to 250° C. and left there for 1 hour. Thereafter, the temperature is increased to 320° C. and this temperature is maintained for 4 hours, the reaction mixture becoming increasingly viscous.

After cooling, the reaction mixture is removed from the flask and powdered, 2N hydrochloric acid is added and the mixture is extracted first with water and then with acetone. The polymer purified in this way is then dried in a vacuum drying cabinet up to a temperature of 240° C. A polyarylene ether-ketone prepared in this manner has a reduced viscosity (1% by weight of polymer in N-methylpyrrolidone (NMP) at 25° C.) of 1.12 dl/g.

EXAMPLES 2–20

The Examples 2–20 shown in the table were prepared in an analogous manner. In deviation from the general instructions, dilute acetic acid and not hydrochloric acid was added to the compounds 6–20. The compounds 6–19 were dissolved in methylene chloride after the water/acetone extraction described, a small amount of insoluble material was filtered off and the product was precipitated by being poured into isopropanol.

The polyarylene ethers of Examples 1–15 and 18–20 are soluble in methylene chloride to the extent of more than 25% by weight. The solutions prepared in this concentration are stable at room temperature for several weeks. No clouding and no polymer precipitate is observed.

| Polyarylene ether prepared from | Reaction conditions | Reduced viscosity [dl/g] | Tg [°C.] (differential scanning calorimetry) | Solubility in $CH_2Cl_2$ |
| --- | --- | --- | --- | --- |
| 1 Polyether-sulfone | | | | |
| Phenylhydroquinone (0.1000 mol) 4,4'-Difluorodiphenyl sulfone (0.1001 mol) Potassium carbonate (0.114 mol) | 1 hour/250° C. 4 hours/320° C. | 1.12 | 194 | >25% |
| 2 Polyether-sulfone | | | | |
| Phenylhydroquinone (0.1001 mol) 4,4'-Dichlorodiphenyl sulfone (0.1002 mol) Potassium carbonate (0.1207 mol) | 45 min/230° C. 45 min/250° C. 30 min/300° C. 3 hours/320° C. | 0.36 | 192 | >25% |
| 3 Polyether-sulfone copolymer | | | | |
| Phenylhydroquinone (0.05 mol) 4,4'-Dihydroxydiphenyl sulfone (0.05 mol) 4,4'-Dichlorodiphenyl sulfone (0.10 mol) Potassium carbonate (0.1106 mol) | 1 hour/250° C.*) 3 hours/320° C. | 0.46 | 208 | >25% |
| 4 Polyether-sulfone copolymer | | | | |
| Phenylhydroquinone (0.0502 mol) 4,4'-Dihydroxydiphenyl sulfone (0.0501 mol) 4,4'-Dichlorodiphenyl sulfone (0.1004 mol) Potassium carbonate (0.1120 mol) | 1 hour/250° C. 5 hours/320° C. | 0.55 | 211 | >25% |
| 5 Polyether-sulfone copolymer | | | | |
| Phenylhydroquinone (0.0502 mol) 4,4'-Dihydroxybiphenyl (0.0503 mol) 4,4'-Dichlorodiphenyl sulfone (0.1003 mol) Potassium carbonate (0.1122 mol) | 1 hour/250° C. 3 hours/320° C. | 0.64 | 199 | >25% |
| 6 Polyether-sulfone copolymer | | | | |
| Phenylhydroquinone (0.3008 mol) 4,4'-Dihydroxydiphenyl sulfone (0.1003 mol) 4,4'-Dichlorodiphenyl sulfone (0.4000 mol) Potassium carbonate (0.4020 mol) | 30 min/225° C. 1 hour/250° C. 3 hours/320° C. | 0.50 | 204 | >25% |
| 7 Polyether-sulfone copolymer | | | | |
| Phenylhydroquinone (0.1334 mol) 4,4'-Dihydroxybiphenyl (0.2677 mol) 4,4'-Dichlorodiphenyl sulfone (0.4000 mol) Potassium carbonate (0.4200 mol) | 30 min/225° C. 1 hour/250° C. 3 hours/300° C. | 0.93 | 208 | >25% |
| 8 Polyether-sulfone copolymer | | | | |
| Phenylhydroquinone (0.2005 mol) 4,4'-Dihydroxydiphenyl sulfone (0.1003 mol) 4,4'-Dihydroxybiphenyl (0.1003 mol) 4,4'-Dichlorodiphenyl sulfone (0.4000 mol) Potassium carbonate (0.4020 mol) | 30 min/225° C. 1 hour/250° C. 3 hours/320° C. | 0.79 | 214 | >25% |
| 9 Polyether-sulfone copolymer | | | | |

-continued

| Polyarylene ether prepared from | Reaction conditions | Reduced viscosity [dl/g] | Tg [°C] (differential scanning calorimetry) | Solubility in CH$_2$Cl$_2$ |
|---|---|---|---|---|
| Phenylhydroquinone (0.1003 mol)<br>4,4'-Dihydroxydiphenyl sulfone (0.1003 mol)<br>4,4'-Dihydroxybiphenyl (0.2005 mol)<br>4,4'-Dichlorodiphenyl sulfone (0.4000 mol)<br>Potassium carbonate (0.4200 mol) | 30 min/225° C.<br>1 hour/250° C.<br>3 hours/320° C. | 1.00 | 231 | >25% |
| 10 Polyether-sulfone copolymer | | | | |
| Phenylhydroquinone (0.1003 mol)<br>4,4'-Dihydroxydiphenyl sulfone (0.2005 mol)<br>4,4'-Dihydroxybiphenyl (0.1003 mol)<br>4,4'-Dichlorodiphenyl sulfone (0.4000 mol)<br>Potassium carbonate (0.4200 mol) | 30 min/225° C.<br>1 hour/250° C.<br>3 hours/320° C. | 0.85 | 233 | >25% |
| 11 Polyether-sulfone copolymer | | | | |
| Phenylhydroquinone (0.2005 mol)<br>2,7-Dihydroxynaphthalene (0.2005 mol)<br>4,4'-Dichlorodiphenyl sulfone (0.4000 mol)<br>Potassium carbonate (0.4200 mol) | 30 min/225° C.<br>1 hour/250° C.<br>3 hours/300° C. | 0.56 | 199 | >25% |
| 12 Polyether-sulfone copolymer | | | | |
| Phenylhydroquinone (0.2005 mol)<br>1,5-Dihydroxynaphthalene (0.2005 mol)<br>4,4'-Dichlorodiphenyl sulfone (0.4000 mol)<br>Potassium carbonate (0.4200 mol) | 30 min/225° C.<br>1 hour/250° C.<br>3 hours/300° C. | 0.53 | 212 | >25% |
| 13 Polyether-sulfone copolymer | | | | |
| Phenylhydroquinone (0.1003 mol)<br>4,4'-Dihydroxydiphenyl sulfone (0.2005 mol)<br>1,5-Dihydroxynaphthalene (0.1003 mol)<br>4,4'-Dichlorodiphenyl sulfone (0.4000 mol)<br>Potassium carbonate (0.4200 mol) | 30 min/225° C.<br>1 hour/250° C.<br>3 hours/300° C. | 0.64 | 222 | >25% |
| 14 Polyether-sulfone copolymer | | | | |
| Phenylhydroquinone (0.1003 mol)<br>4,4'-Dihydroxybiphenyl (0.1003 mol)<br>1,5-Dihydroxynaphthalene (0.2005 mol)<br>4,4'-Dichlorodiphenyl sulfone (0.4000 mol)<br>Potassium carbonate (0.4200 mol) | 30 min/225° C.<br>1 hour/250° C.<br>3 hours/300° C. | 0.59 | 216 | >25% |
| 15 Polyether-sulfone copolymer | | | | |
| Phenylhydroquinone (0.1003 mol)<br>4,4'-Dihydroxybiphenyl (0.2005 mol)<br>1,5-Dihydroxynaphthalene (0.1003 mol)<br>4,4'-Dichlorodiphenyl sulfone (0.4000 mol)<br>Potassium carbonate (0.4200 mol) | 30 min/225° C.<br>1 hour/250° C.<br>3 hours/300° C. | 0.69 | 215 | >25% |
| 16 Polyether-sulfone-ketone copolymer | | | | |
| Phenylhydroquinone (0.2007 mol)<br>4,4'-Dihydroxydiphenyl sulfone (0.2006 mol)<br>4,4'-Dichlorodiphenyl sulfone (0.3001 mol)<br>4,4'-Difluorobenzophenone (0.1001 mol)<br>Potassium carbonate (0.4233 mol) | 1 hour/250° C.<br>1 hour/275° C.<br>1 hour/300° C.<br>3 hours/320° C. | 0.58 | 191 | >20% |
| 17 Polyether-sulfone-ketone copolymer | | | | |
| Phenylhydroquinone (0.2006 mol)<br>4,4'-Dihydroxydiphenyl sulfone (0.2006 mol)<br>4,4'-Dichlorodiphenyl sulfone (0.2001 mol)<br>4,4'-Difluorobenzophenone (0.2002 mol)<br>Potassium carbonate (0.4218 mol) | 1 hour/250° C.<br>1 hour/275° C.<br>1 hour/300° C.<br>3 hours/320° C. | 0.53 | 191 | >20% |
| 18 Polyether-sulfone copolymer | | | | |
| Phenylhydroquinone (0.0503 mol)<br>3,3',5,5'-Tetramethyl-4,4'-dihydroxy-<br>diphenyl sulfone (0.0502 mol)<br>4,4'-Dichlorodiphenyl sulfone (0.1001 mol)<br>Potassium carbonate (0.1052 mol) | 1 hour/250° C.<br>1 hour/275° C.<br>4 hours/280° C. | 0.48 | 224 | >25% |
| 19 Polyether-sulfone copolymer | | | | |
| Phenylhydroquinone (0.0502 mol)<br>3,3',5,5'-Tetramethyl-4,4'dihydroxy-<br>biphenyl (0.0635 mol)<br>4,4'-Dichlorodiphenyl sulfone (0.1001 mol)<br>Potassium carbonate (0.1001 mol) | 1 hour/250° C.<br>1 hour/275° C.<br>4 hours/280° C. | 0.23 | 230 | >25% |
| 20 Polyether-sulfone | | | | |
| 2-(4-Methylphenyl)-hydroquinone (0.0999 mol)<br>4,4'-Dichlorodiphenyl sulfone (0.1002 mol)<br>Potassium carbonate (0.1119 mol) | 1 hour/250° C.<br>3 hours/280° C. | 0.82 | 196 | >25% |

*)Reaction without added xylene, removal of water by distillation at 250° C.
Reduced viscosity: 1% by weight of polymer in NMP at 25° C. (NMP:N-Methylpyrrolidone)
The polyarylene ethers thus prepared are pressed in a plate press at 280° C. under a force of 3000 N for 10 minutes. Clear, flexible films which can be bent and folded repeatedly without fracture are obtained.

EXAMPLE 21

710 g (2.84 mol) of 4,4'-dihydroxydiphenyl sulfone, 59.5 g (0.32 mol) of phenylhydroquinone, 892 g (3.11 mol) of 4,4'-dichlorodiphenyl sulfone, 462 g (3.33 mol) of potassium carbonate and 1660 g of diphenyl-sulfone are heated at 180° C. in a 10l metal reactor while flushing with nitrogen. When an internal temperature of 180° C. is reached, the mixture of raw materials is stirred for 2 hours. The water of condensation formed in the reaction distils off continuously from the reaction mixture via a descending condenser. After 2 hours at 180° C., the reaction temperature is increased in stages to 270° C. in the course of a further 2 hours. When 270° C. is reached, the temperature is kept constant for 4 hours. The reaction mixture is subsequently removed from the reaction vessel via a bottom valve and, after cooling, is coarsely ground.

The ground reaction mixture is worked up by extraction (3×acetone/water=80/20; 1×water). To liberate the OH end groups, concentrated acetic acid is added during the water extraction. The polyether sulfone copolymer is subsequently dried in vacuo at 100° C. It has a reduced viscosity of 0.67 dl/g (1% of polymer in NMP at 25° C.), a glass transition temperature of 227° C. and an OH end group content of 55 μequivalents/g. It is soluble in methylene chloride to the extent of more than 25% to give a clear solution.

EXAMPLE 22

200 ml of xylene, 400 ml of N-methylpyrrolidone (NMO), 37.25 g (0.2000 mol) of phenylhydroquinone and 69.13 g (0.5002 mol) of potassium carbonate are heated under reflux in a round-bottomed flask under nitrogen for 2 hours and a xylene/NMP/water mixture (210 ml) is distilled off via a water separator. After cooling, 57.50 g of 4,4'-dichlorodiphenyl sulfone (0.2002 mol) are added. The reaction mixture is now heated under reflux for 2 hours, left to stand overnight at room temperature and then heated under reflux for a further 6 hours.

After cooling, the viscous solution is diluted with 200 ml of NMP and the polymer is precipitated by being poured into isopropanol. The precipitate is filtered off, dilute acetic acid is added and the mixture is extracted first with water and then with a water/acetone mixture (1:4). The polymer is subsequently dissolved in methylene chloride, a small amount of insoluble material is filtered off and the product is precipitated in isopropanol. The polymer is dried in a vacuum drying cabinet up to a temperature of 240° C. A polyether-sulfone which is prepared by this process and contains phenylhydroquinone units has a reduced viscosity (1% of polymer in NMP at 25° C.) of 0.44 dl/g. It is soluble in methylene chloride to the extent of more than 25%.

EXAMPLE 23

A polyether sulfone copolymer is prepared according to the synthesis process described in Example 21 from 670.5 g (2.673 mol) of 4,4'-dihydroxydiphenyl sulfone, 88.2 g (0.4725 mol) of phenylhydroquinone, 891 g (3.1023 mol) of 4,4'-dichlorodiphenyl sulfone and 461.5 g (3.334 mol) of potassium carbonate. The resulting polymer has a reduced viscosity of 0.46 dl/g, an OH end group content of 46 μequivalents/g and a glass transition temperature of 234° C.

This polymer is introduced as a solution in methylene chloride, in accordance with the parts by weight shown in the table, into a mixture consisting of 50 parts of tetraglycidyldiaminodiphenylmethane and 50 parts of triglycidyl-p-aminophenol and the solvent is removed in vacuo. After addition of 50 parts of p-diaminodiphenyl sulfone, the mixture is hardened at 160° C. for 2 hours and at 210° C. for 2 hours and at 210° C. for 2 hours. Test specimens are cut out of a plate produced in this way and the fracture toughness ($G_{Ic}$, by means of the bend notch in accordance with ASTM E 399) is determined. In all the concentrations (10, 20 and 30 parts of added polyether sulfone), considerably higher $G_{Ic}$ values result for the polyether-sulfones according to the invention in comparison with test specimens produced analogously using a commercially available polyether sulfone (Victrex 5003 P).

TABLE

| Fracture toughness of thermoplast-modified epoxy resins | | |
|---|---|---|
| Addition of thermoplastic | Fracture toughness ($G_{Ic}$)(J/m$^2$) | |
| (parts) | Example 23 | Comparison |
| 10 | 225 | 177 |
| 20 | 268 | 211 |
| 30 | 357 | 291 |

What is claimed is:

1. A polyarylene ether which consists essentially of based on the total amount of structural elements present in the polyether resin, 5–100 mol % of a recurring structural element of the formula I

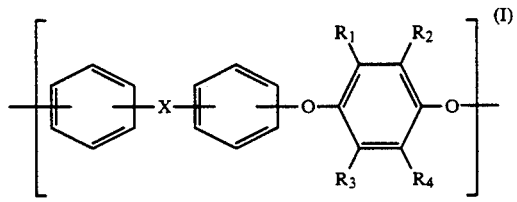

and 0–95 mol % of a recurring structural element of the formula II

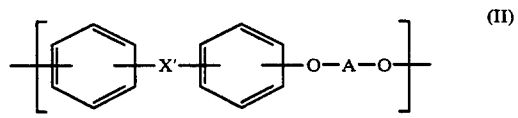

in which X and X' independently of one another are —SO—, —SO$_2$— or —CO—, one of the radicals $R_1$, $R_2$, $R_3$ and $R_4$ is phenyl or phenyl which is substituted by one to three (C$_1$–C$_4$)alkyl groups and the remaining radicals $R_1$, $R_2$, $R_3$ and $R_4$ independently of one another are hydrogen, (C$_1$–C$_4$)alkyl, phenyl or phenyl which is substituted by one to three (C$_1$–C$_4$)alkyl groups, and A is a group of the formulae IIIa to IIIg

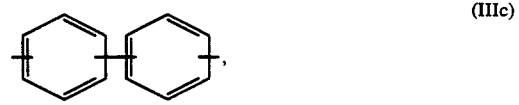

-continued

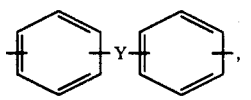  (IIId)

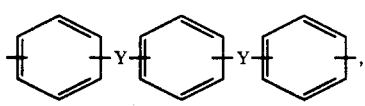  (IIIe)

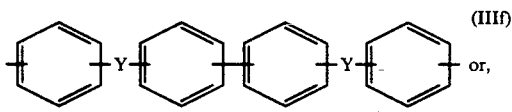 or, (IIIf)

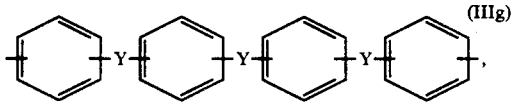  (IIIg)

in which Y is —$CH_2$—, —$C(CH_3)_2$—, —$C(CH_3)(C_6H_5)$—, —$C(CF_3)_2$—, —S—, —SO—, —$SO_2$—, —O— or —CO—, with the proviso that at least 25% of the bonds X and/or X' and/or Y are —$SO_2$—.

2. A polyarylene ether according to claim 1, which contains 10-100 mol % of a recurring structural element of the formula I and 90-0 mol % of a recurring structural element of the formula II.

3. A polyarylene ether according to claim 1, which contains 25-100 mol % of a recurring structural element of the formula I and 75-0 mol % of a recurring structural element of the formula II.

4. A polyarylene ether according to claim 1, in which at least 50% of the bonds X and/or X' and/or Y are —$SO_2$—.

5. A polyarylene ether according to claim 1, in which one or two of the radicals $R_1$, $R_2$, $R_3$ and $R_4$ is phenyl or tolyl and the others are hydrogen.

6. A polyarylene ether according to claim 4, in which one of the radicals $R_1$, $R_2$, $R_3$ or $R_4$ is phenyl.

7. A polyarylene ether according to claim 1, in which Y in the formulae IIId, IIIe, IIIf and IIIg is —$C(CH_3)_2$—, —S—, —$SO_2$—, —O— or —CO—.

8. A polyarylene ether according to claim 1, in which A is a group of the formula IIIa, IIIb, IIIc or IIId in which Y is —$C(CH_3)_2$—, —S—, —$SO_2$—, —O— or —CO—.

9. A polyarylene ether according to claim 1, in which X in formula I and X' in formula II independently of one another are —$SO_2$— or —CO—.

10. A polyarylene ether according to claim 8, in which X and X' are —$SO_2$—.

11. A polyarylene ether according to claim 1, in which X and X' are —$SO_2$— and A corresponds to formula IIIb or formula IIIc.

12. A polyarylene ether according to claim 1, in which X and X' are —$SO_2$— and A is

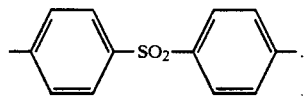

13. A process for the preparation of a polyarylene ether according to claim 1, which comprises subjecting at least one compound of the formula IV

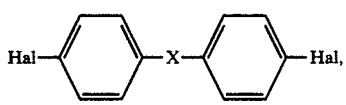  (IV)

in which Hal is halogen, and X is as defined in claim 1, to a polycondensation reaction with a hydroquinone of the formula V

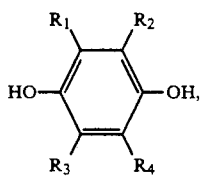  (V)

in which $R_1$, $R_2$, $R_3$ and $R_4$ are as defined in claim 1, by itself or with a mixture of a compound of the formula V and a phenol contained therein to the extent of 95 mol %, of the formula VI

HO—A—OH   (VI)

in which A is as defined in claim 1, in the presence of alkaline catalysts in dimethyl sulfoxide, dimethylacetamide, diethylacetamide, tetramethylurea, N-methylcaprolactam, N-methylpyrrolidone or diphenyl sulfone.

14. The process according to claim 13, in which the corresponding alkali metal or alkaline earth metal phenolates are employed instead of the diphenol of the formulae V and VI.

15. The process according to claim 13, wherein the polycondensation reaction is carried out in approximately equimolar ratios of the compounds IV:V or IV:(V+VI).

16. The process according to claim 15, wherein the molar ratio of the compounds IV:V or IV:(V+VI) is 0.8:1.2 to 1.2:0.8.

17. The process according to claim 16, wherein the molar ratio of the compounds IV:V or IV:(V+VI) is 0.8:1.0 to 1.0:0.8.

* * * * *